(12) United States Patent
Djabarov et al.

(10) Patent No.: US 8,522,162 B2
(45) Date of Patent: Aug. 27, 2013

(54) MINI TOOLBAR USER INTERFACE

(75) Inventors: Gueorgui N. Djabarov, Sunnyvale, CA (US); Jonathan C. Perkins, Mountain View, CA (US)

(73) Assignee: Google Inc., Mountain View, CA (US)

( * ) Notice: Subject to any disclaimer, the term of this patent is extended or adjusted under 35 U.S.C. 154(b) by 33 days.

(21) Appl. No.: 13/274,259

(22) Filed: Oct. 14, 2011

(65) Prior Publication Data

US 2012/0036477 A1     Feb. 9, 2012

Related U.S. Application Data

(63) Continuation of application No. 11/696,115, filed on Apr. 3, 2007, now Pat. No. 8,042,060.

(60) Provisional application No. 60/790,411, filed on Apr. 7, 2006.

(51) Int. Cl.
G06F 3/048     (2006.01)
G06F 3/00      (2006.01)

(52) U.S. Cl.
USPC ........... 715/811; 715/779; 715/795; 715/810; 715/840

(58) Field of Classification Search
USPC .......... 715/779, 795, 810, 811, 840
See application file for complete search history.

(56) References Cited

U.S. PATENT DOCUMENTS

| 5,644,737 | A | 7/1997 | Tuniman et al. | |
| 5,883,626 | A | 3/1999 | Glaser et al. | |
| 6,141,003 | A | 10/2000 | Chor et al. | |
| 6,564,213 | B1 * | 5/2003 | Ortega et al. | 1/1 |
| 6,886,134 | B1 | 4/2005 | Cason | |
| 2001/0035885 | A1 * | 11/2001 | Iron et al. | 345/855 |
| 2002/0135617 | A1 * | 9/2002 | Samid | 345/764 |
| 2003/0174154 | A1 * | 9/2003 | Yukie et al. | 345/700 |
| 2006/0095860 | A1 * | 5/2006 | Wada et al. | 715/771 |
| 2006/0253794 | A1 * | 11/2006 | Wilson | 715/779 |
| 2006/0282416 | A1 * | 12/2006 | Gross et al. | 707/3 |

* cited by examiner

*Primary Examiner* — Nicholas Augustine
(74) *Attorney, Agent, or Firm* — Harrity & Harrity, LLP

(57) ABSTRACT

A toolbar in a client application such as a web browser may be miniaturized. The miniature toolbar annexes itself to a part of the chrome region of the client application, modifying the functionality of the annexed part. The annexed part may be a search box. At least a subset of the features of the toolbar is accessible from the miniature toolbar, but some toolbar features may not be accessible from the miniature toolbar. Some features of the miniature toolbar may replace some features of the annexed search box.

22 Claims, 7 Drawing Sheets

MINI TOOLBAR USER INTERFACE

RELATED APPLICATIONS

This application is a continuation of U.S. patent application Ser. No. 11/696,115, filed Apr. 3, 2007, now U.S. Pat. No. 8,042,060, which claimed priority to U.S. Provisional Patent Application 60/790,411, filed Apr. 7, 2006, each of which is incorporated herein by reference in its entirety.

TECHNICAL FIELD

The disclosed embodiments relate generally to graphical user interfaces, and more particularly, to a graphical user interface for a toolbar that may be miniaturized or minimized.

BACKGROUND

A challenge in the design of graphical user interfaces (GUIs) is allocating the available screen space amongst the various components of the GUI. For example, in a web browser, various components, such as the status bar, navigation bar, and toolbars, compete with the webpage display area for screen space.

A current trend in web browser GUIs is the proliferation of client assistants or toolbars that add functionality on top of the functionality offered by the web browser. These toolbars offer features such as performing searches on search engines, blocking pop-up advertisements, automatically filling out forms, and so forth. The addition of these toolbars to the web browser GUI can contribute to a cluttered web browser user interface and can take away screen space from the webpage display area.

Accordingly, there is a need for a space-efficient graphical user interface for web browsers and other browser applications.

SUMMARY

According to some embodiments, a user interface includes a toolbar. The toolbar includes one or more first selectable options corresponding to operations and a second selectable option. Selection of the second selectable option activates annexation of an object corresponding to the toolbar to at least a part of a chrome region of the user interface, thereby enabling selection of the first selectable options from the chrome region.

According to some embodiments, a method of modifying a user interface having a chrome region includes annexing a client assistant interface comprising one or more selectable options to at least a part of the chrome region, thereby enabling selection of the selectable options from the chrome region. The annexing includes replacing at least one selectable option that was previously part of the chrome region.

BRIEF DESCRIPTION OF THE DRAWINGS

Like reference numerals refer to corresponding parts throughout the drawings.

DESCRIPTION OF EMBODIMENTS

A toolbar in a user interface may be miniaturized or minimized. The miniaturized toolbar annexes itself to the chrome region of the user interface, whereby the functionality associated with the toolbar may be accessed from the annexed part of the chrome region.

Figure 1:
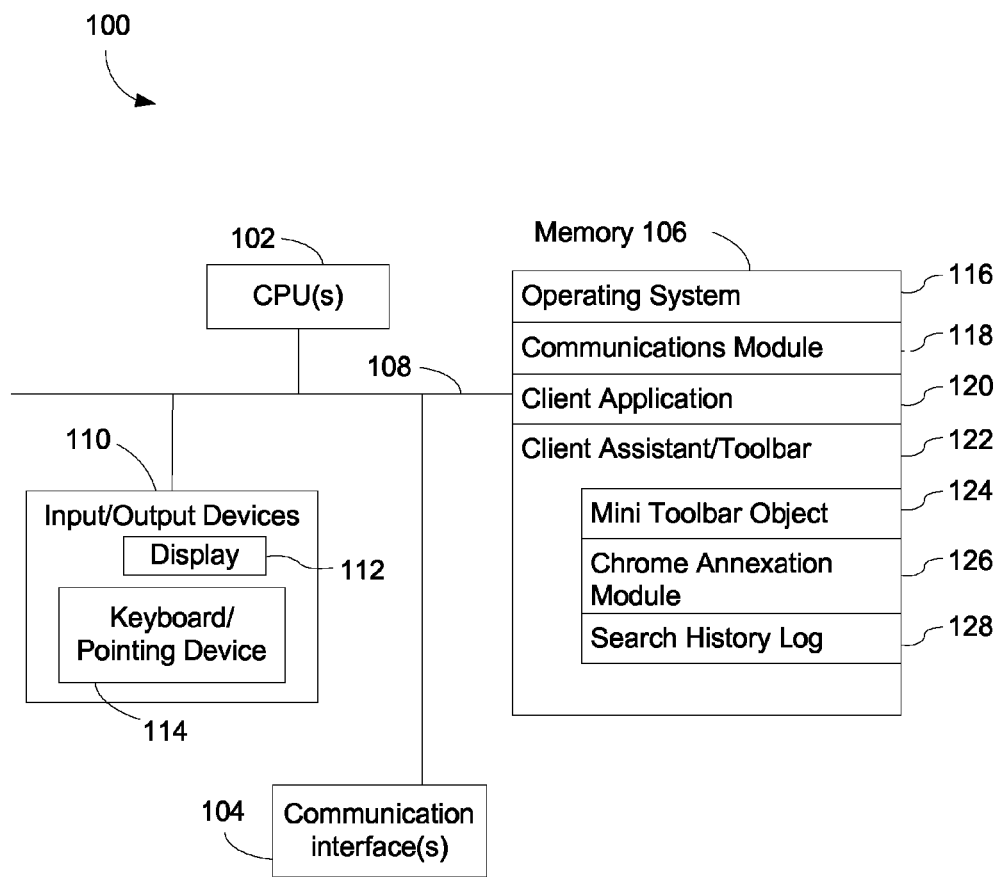
FIG. 1 is a block diagram illustrating a client computer in accordance with some embodiments.

FIG. 1 is a block diagram illustrating a client computer or client device in accordance with some embodiments. The client computer or device 100 (hereinafter called a client computer, for ease of reference) typically includes one or more processing units (CPU's) 102, one or more network or other communications interfaces 104, memory 106, and one or more communication buses 108 for interconnecting these components. The client computer 100 may include input and output devices 110 comprising a display device 112 and input devices such as a keyboard and/or a pointing device 114. Memory 106 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 106 may optionally include one or more storage devices remotely located from the CPU(s) 102. In some embodiments, memory 106 stores the one or more programs or modules, and may also store one or more data structures. The information stored in memory 106 may include the following, or a subset or superset thereof:

- an operating system 116 that includes procedures for handling various basic system services and for performing hardware dependent tasks;
- a network communication module 118 that is used for connecting the client computer 126 to other computers via the one or more communication network interfaces 104 (wired or wireless), such as the Internet, other wide area networks, local area networks, metropolitan area networks, and so on;
- a client application 120 (e.g., a web browser or other program for displaying documents, including documents retrieved from remotely located hosts 142);
- a client assistant or toolbar 122 for providing additional functionality to a client application 120; and
- one or more documents 130, such as one or more webpages to be displayed using the client application 120; optionally, the one or more documents 130 may be been downloaded from remotely located hosts 142 via the communication interface 104 and a communications network 140 (e.g., the Internet), using the network communication module 118.

The client assistant or toolbar 122 may include the following, or a subset thereof:

- a mini toolbar object 124 for providing at least a subset of the functionality that is provided by the client assistant/toolbar 122;
- a chrome annexation module 126 for annexing the mini toolbar object to a chrome region of the user interface of the client application 120; and
- optionally, a search history log 128 for storing a log of searches performed from the client assistant or toolbar 126 and objects associated with same.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 106 may store a subset of the modules and data structures identified above. Furthermore, memory 106 may store additional modules and data structures not described above.

The client computer 100 is a device from which a user may access documents. The client 100 may be any device capable of communicating with other computers, devices, and so forth through one or more networks. Examples of client devices may include, without limitation, desktop computers, notebook (or laptop) computers, personal digital assistants (PDAs), mobile phones, network terminals, and so forth. The client device includes one or more client applications 120 for communicating with other computers or devices and accessing documents or services. In some embodiments, the client application 120 is a web browser for viewing documents such as webpages written in the Hypertext Markup Language (HTML) and images.

Figure 2:
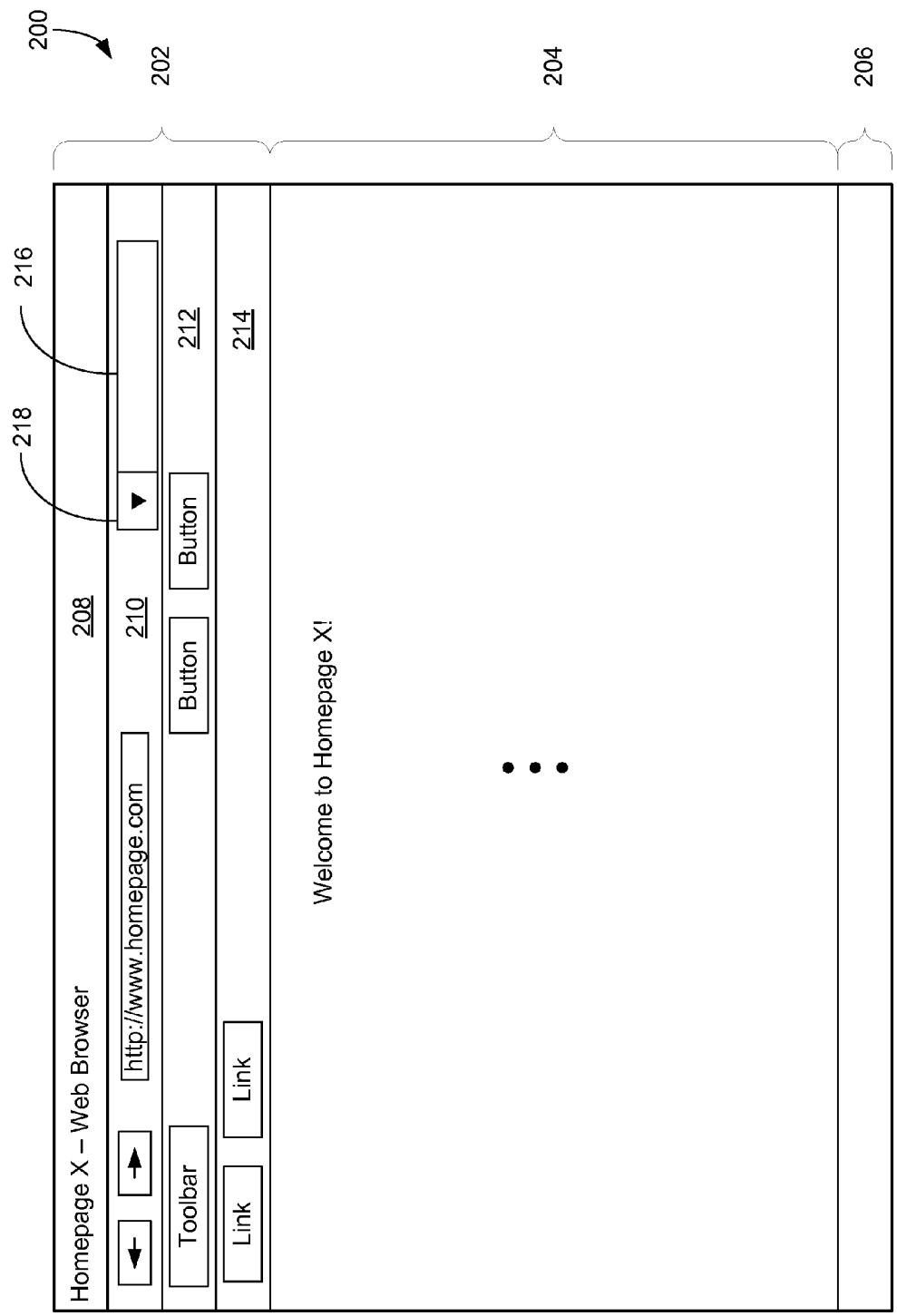
FIG. 2 illustrates a web browser user interface in accordance with some embodiments.

FIG. 2 illustrates a web browser graphical user interface in accordance with some embodiments. A typical web browser window 200 includes a plurality of user interface components. A web browser window 200 may include a chrome region 202, a document display region 204, and a status bar 206. The chrome region 202 is a privileged display region (or a set of privileged display regions) of the browser window reserved for displaying menus, buttons, titles, status information, and the like. The chrome region 202 is sometimes called "the chrome" or "the browser chrome."

The chrome region 202 holds various buttons, menus, and other user interface components for activating and deactivating operations and functions of the web browser, changing settings, displaying information, and so forth. User interface components that may be located in the chrome region 202 may include a title bar 208, a navigation bar 210, and one or more toolbars, such as a functional toolbar 212 or a bookmarks or links toolbar 214. The title bar 208 displays a title of the document being viewed in the document display region 204 and the name of the web browser application. The navigation bar 210 provides tools for navigating through documents, such as back and forward buttons, a stop download button, and a box for displaying or typing the Uniform Resource Locator (URL) of a website or document. A functional toolbar 212 includes buttons, menus, and the like for accessing various features or tools. A bookmarks or links toolbar 214 includes one or more buttons or the like for links to websites or documents.

Documents are shown in the document display region 204. If a document to be shown in the document display region 204 has a larger horizontal dimension or vertical dimension than the respective dimension of the document display region 204, scrollbars (not shown) may be provided to the user for scrolling the document. The status bar 206 displays various information, such as the download progression of a document or the target of a hyperlink.

While the description above describes the chrome region 202 and the status bar 206 separately, it should be appreciated that the status bar 206 may be considered a part of the chrome region 202.

Figure 3A:
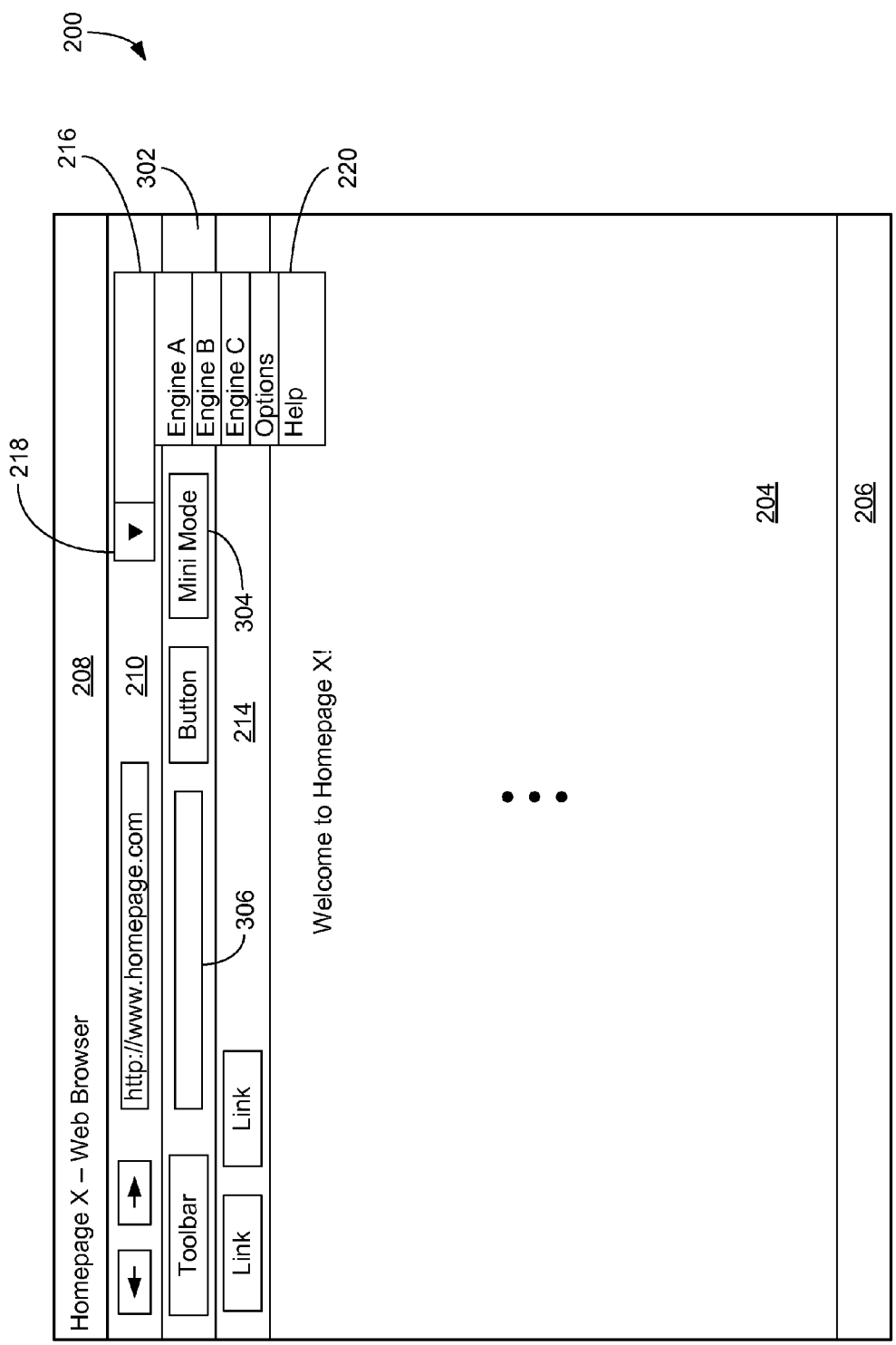
FIGS. 3A-3B illustrates web browser user interfaces having a toolbar that may be "miniaturized" in accordance with some embodiments.
Figure 3B:
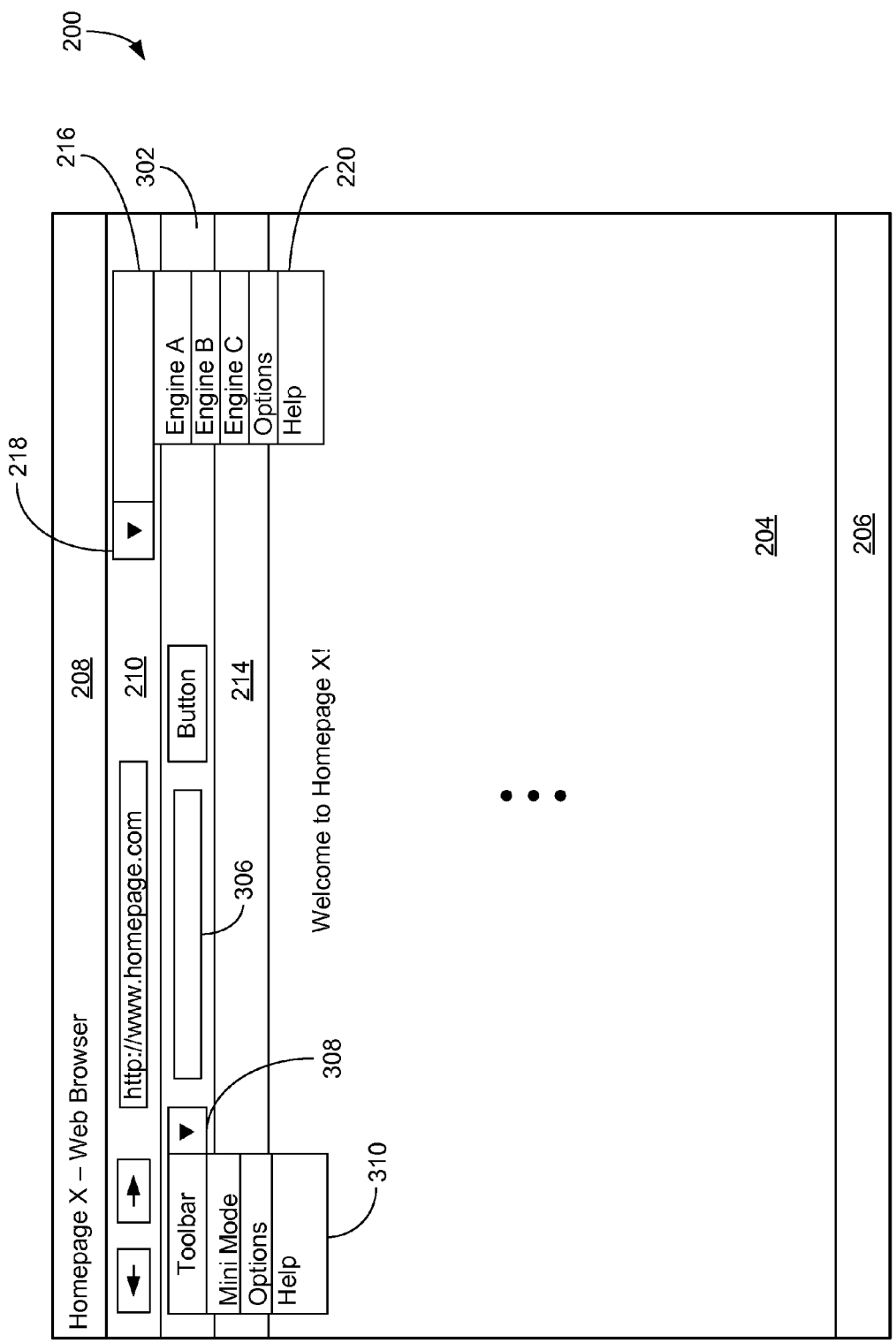

The chrome region 202 may also include a browser search box 216. The browser search box 216 provides the functionality of searching a search engine without having to navigate to a search engine website first. The search box 216 may include a search box menu 220 (FIG. 3A-3B). From the menu 220, the user may configure the search box 216, including selecting the search engine to be searched (i.e., the search engine to be used for executing searches). The menu 220 may be accessed by the user clicking on a search box chevron 218 or the like In some embodiments, the chrome region 202 may be configured to allow some customization by the user. For example, the user may add and remove links from a bookmarks toolbar 214. The user may add or remove components from a functional toolbar 212. The user may rearrange the order of the links or components in the bookmarks toolbar 214 or the functional toolbar 212. The user can also hide the functional toolbar 212 or bookmark toolbar 214. The customizability by the user may be limited to a subset of the chrome region 202. In some embodiments, an application programming interface (API) to the customizable region of the chrome region 202 may be provided.

The remainder of the chrome region 202 may be configured to be a reserved region, where the user may have no or limited capability for customization. Alternately stated, in normal operation the user is typically unable to modify the tools and features displayed in the reserved region(s) of a browser's chrome region. For example the user may be prevented from removing or rearranging components in the reserved region of the chrome. Furthermore, user interface components made using the API described above may be restricted from interacting with user interface components in the reserved region. In some embodiments, user interface components that may be displayed or included in the reserved region include the navigation bar 210 and the search box 216. In some embodiments, the reserved region of the chrome comprises the title bar 208 and the navigation bar 210. One aspect of the present invention involves annexing a miniaturized or minimized toolbar to a portion of the reserved region of a browser's chrome region, thereby superseding some of the customization restrictions normally associated with the reserved region of the browser's chrome region.

FIGS. 3A-3B illustrate web browser user interfaces having a toolbar that may be miniaturized in accordance with some embodiments. FIGS. 3A and 3B show exemplary embodiments of a toolbar that may be miniaturized or minimized and yet still have at least some of its functionality accessible from a reserved region or portion of the chrome region 202.

A client assistant or toolbar that provides functionality in addition to what is provided natively by the web browser may be placed in the chrome region 202. The client assistant/toolbar 302 may be miniaturizable. The miniaturizable toolbar 302 may include various buttons, menus, and other components selectable by the user for accessing features, operations, and tools. Among the components is a search box 306. The search box 306 may be configured to search in any of a plurality of search engines. In some embodiments, the plurality of search engines are all associated with a single search engine provider. In some embodiments, the search box 306 may provide search term suggestions or suggested spelling corrections to search queries typed within.

In some embodiments, the toolbar 302 may maintain a search history log (e.g., search history log 128 (FIG. 1)) of search queries searched from the search box 306. In some embodiments, if the toolbar 302 is associated with a particular search engine, when the user enters and searches queries in the associated search engine, the toolbar 302 may log those searches in the search history log as well. The search history log may be maintained until the user closes the web browser or maintained across browser sessions, and may be cleared at the user's command. In some embodiments, whenever a user types in a query into the toolbar search box 306, past queries that have terms matching those of the typed-in query may be displayed.

The toolbar 302 also includes a selectable component or option for miniaturizing or minimizing the toolbar. In some embodiments, the component may be a button 304 (FIG. 3A) on the toolbar 302. The component or option for miniaturizing or minimizing the toolbar may be appropriately labeled in the toolbar's GUI for easy recognition by the user. In FIG. 3A, the component has an exemplary label of "Mini Mode". In some other embodiments, the component may be an option in a menu 310 that is accessible by clicking on a chevron 308 or the like in the toolbar 302. When the option is selected, the toolbar 302 is hidden from display and a mini toolbar object is activated, further details of which are described below.

Figure 4A:
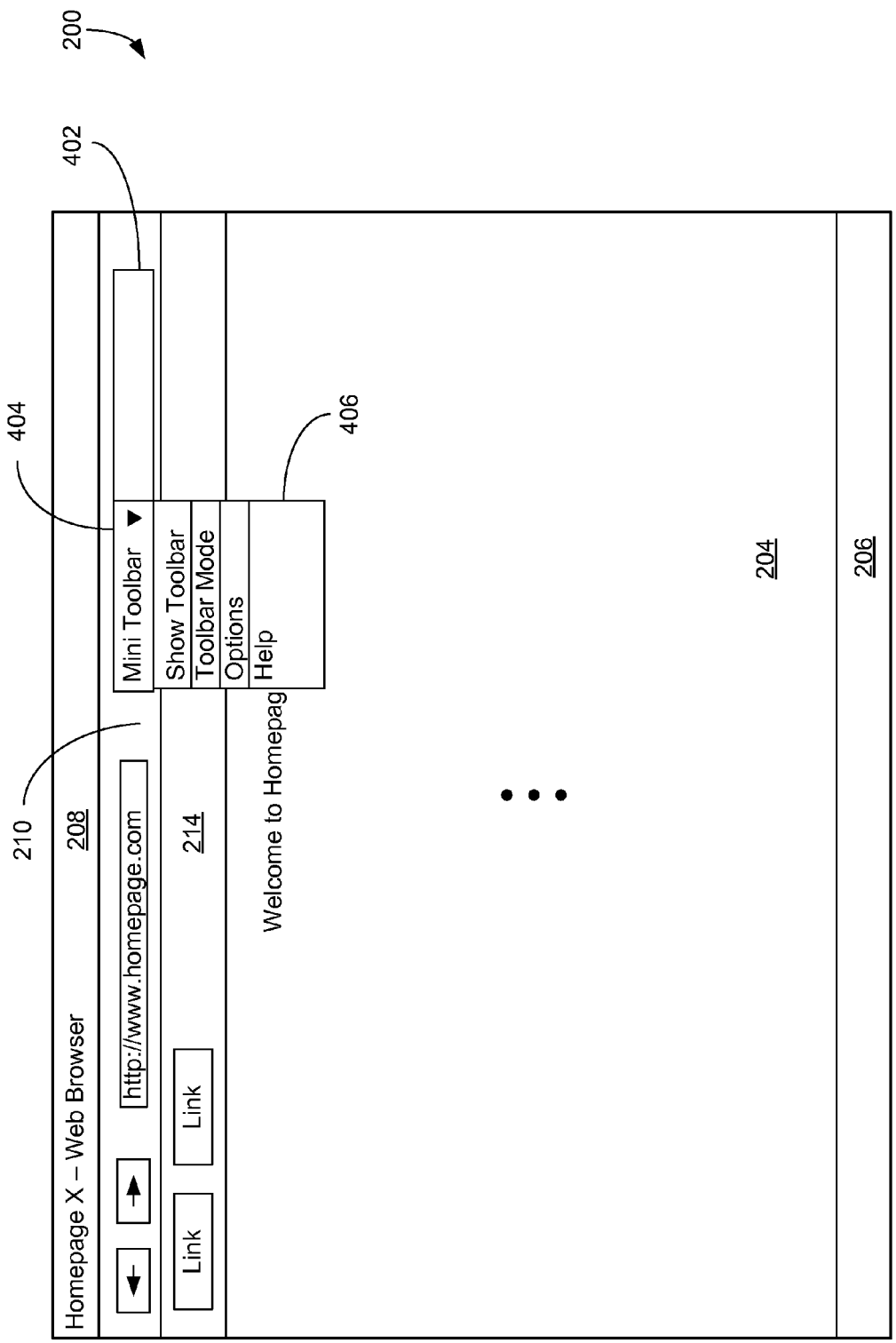
FIGS. 4A-4B illustrates web browser user interfaces having a "miniaturized" toolbar in accordance with some embodiments.
Figure 4B:
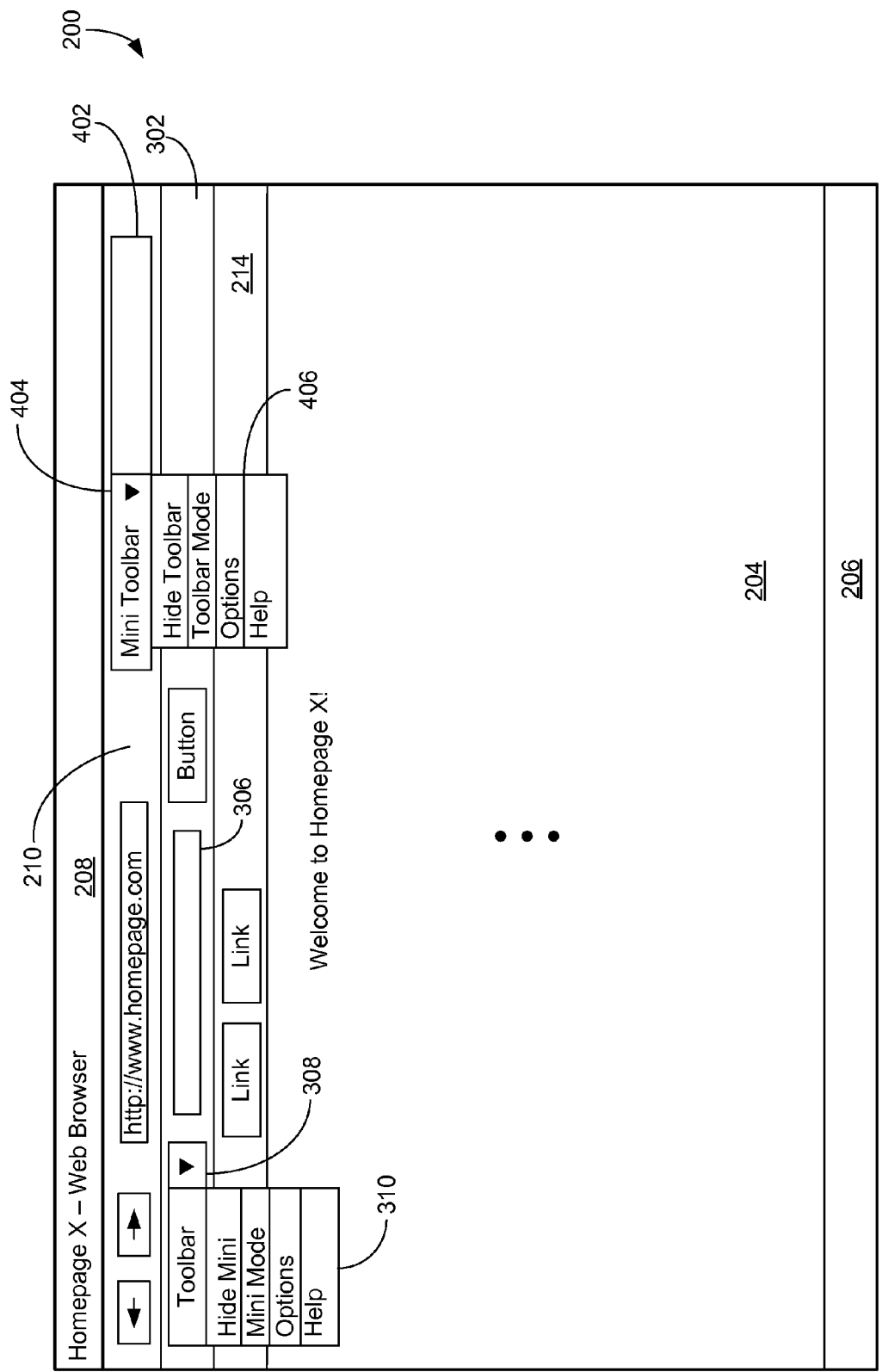

FIGS. 4A-4B illustrates web browser user interfaces having a "miniaturized" toolbar in accordance with some embodiments. When the option to miniaturize is selected, a mini toolbar object corresponding to the toolbar is annexed to a part of the chrome region 202 outside of the toolbar 302, such as a reserved region of the chrome region 202. Furthermore, the toolbar 302 may be hidden or visible while the miniature toolbar object is annexed to the chrome region 202.

As used herein, the mini toolbar object is a module of the toolbar 302 and includes an associated user interface component. The mini toolbar object allows access to at least a subset of the features and tools that the toolbar 302 provides. The mini toolbar object can annex itself to another part of the chrome region, modifying the user interface and functionality of the annexed part.

One part of the chrome region to which the mini toolbar object may annex is the browser search box 216 (which is a region of the navigation bar 210 in this example), even if the browser search box 216 is in a reserved region of the chrome region 202. In some embodiments, the mini toolbar object may annex the search box 216 by overlaying its user interface component over the search box 216 in the user interface. In some other embodiments, the mini toolbar object "takes over" the search box 216 and adds its user interface component directly to the search box 216, modifying the functionality of the search box 216. The result is a mini toolbar search box 402, sometimes herein called a "mini toolbar" (which is short for "miniaturized toolbar" or "minimized toolbar"). The mini toolbar 402 includes a menu 406, which may be accessed by selecting a chevron 404 or the like. From the menu 406 of the mini toolbar 402, a user can access at least a subset of the features, tools, and operations that may be accessed from the toolbar 302 (which may sometimes be called the "full toolbar"). For example, some of the features accessible from the toolbar 302 may be accessible from the mini toolbar menu 406. The user may also perform searches from the mini toolbar search box 402 as he would from the toolbar search box 306. In some embodiments, some features, tools, or operations that are accessible from the toolbar 302 are not accessible from the mini toolbar search box 402 or the mini toolbar menu 406, while in other embodiments all the features of the toolbar 302 are accessible from the mini toolbar 402 or its menu 406.

In some embodiments, the mini toolbar search box 402 and the toolbar search box 306 share a combined search history log. As a result, search queries submitted using the mini toolbar search box 402 are logged and are accessible from the toolbar search box 306, and vice versa.

The features or operations accessible from the mini toolbar search box 402 may replace at least some of the features that were accessible from the browser search box 216. For example, the mini toolbar search box 402 and the browser search box 216 may offer different lists of search engines that may be searched using the respective search box.

While the mini toolbar search box 402 is active, the toolbar 302 may be hidden or visible. When the mini toolbar search box 402 is activated, the toolbar is 302 hidden from view, as shown in FIG. 4A. The mini toolbar menu 406 may display a selectable option to make the toolbar 302 visible ("Show Toolbar" in menu 406 (FIG. 4A)) or even to switch to a toolbar-only mode ("Toolbar Mode" in menu 406 (FIG. 4A)) that deactivates the mini toolbar search box 402 and brings back the browser search box 216.

The toolbar 302 may also be visible while the mini toolbar search box 402 is active, as shown in FIG. 4B. While the toolbar 302 is visible, the mini toolbar menu 406 may include a selectable option to hide the toolbar 302 ("Hide Toolbar" in menu 406 (FIG. 4B)) and an option to switch to a toolbar-only mode ("Toolbar Mode" in menu 406 (FIG. 4B)) and deactivate the mini toolbar search box 402. The toolbar 302 may include an option to hide or deactivate the mini toolbar search box 402 ("Hide Mini" in menu 310 (FIG. 4B)) and an option to switch to a mini toolbar only mode and hide the toolbar 302 ("Mini Mode" in menu 310 (FIG. 4B)). In some embodiments, when the mini toolbar search box 402 is hidden or deactivated, the browser search box 216 becomes active and visible.

Figure 5:
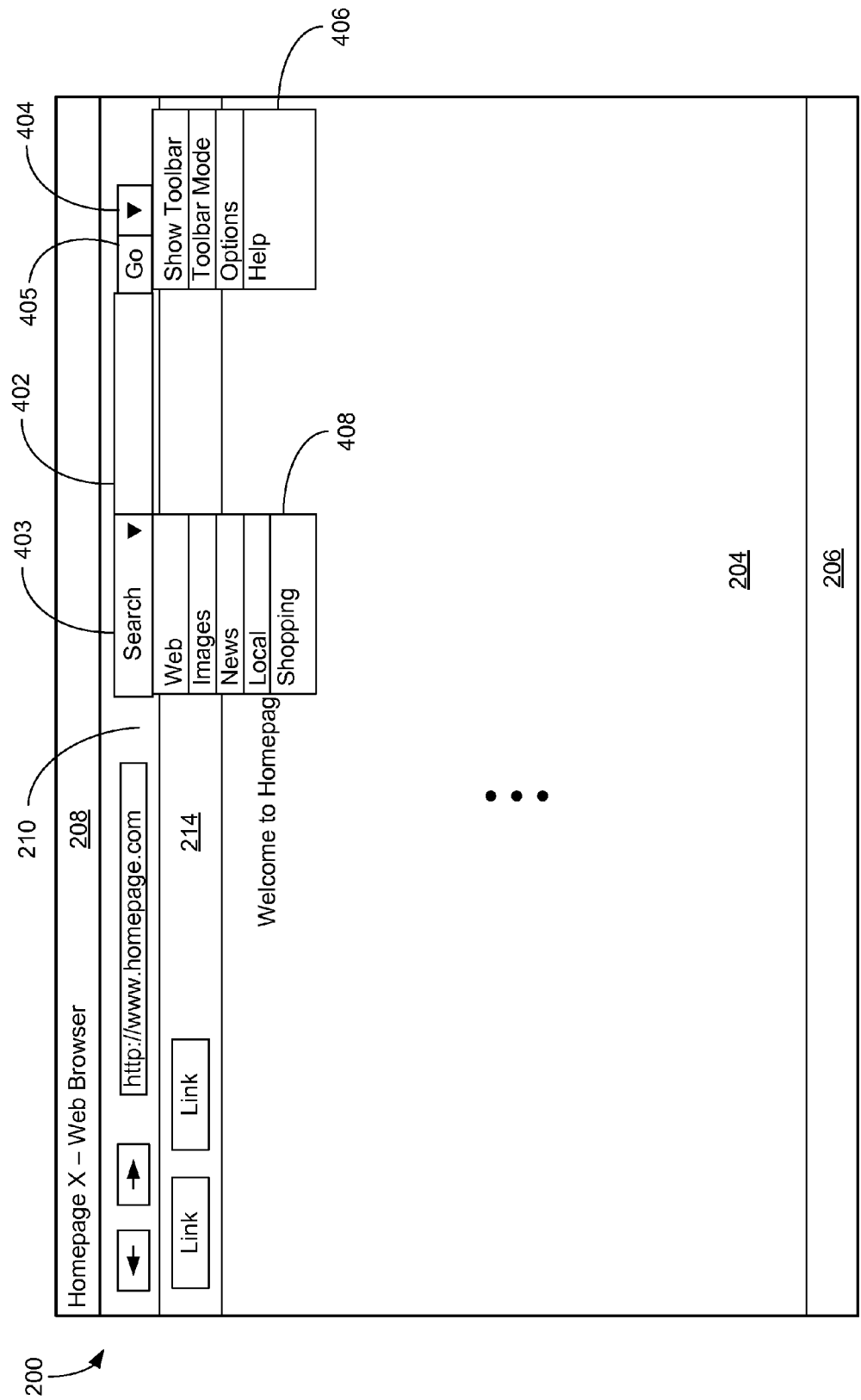
FIG. 5 illustrates another web browser user interface having a "miniaturized" toolbar in accordance with some embodiments.

FIG. 5 illustrates another web browser user interface having a "miniaturized" toolbar in accordance with some embodiments. Here, the mini toolbar includes a search type menu 408 as well as the mini toolbar menu 406 and the mini toolbar menu chevron 404. The mini toolbar also includes a "Go" button 405. The mini toolbar menu 404 provides access to options such as showing the toolbar 302, settings options, and help information.

The "Go" button 405, when clicked by the user, initiates a search by a search engine of the search query entered by the user into the mini toolbar search box 402. The "Go" button 405 provides another way to activate the search, in addition to hitting an Enter key on a keyboard or the like.

The search type menu 408 provides a variety of search types or search engines that may be accessed from the mini toolbar search box 402. Search types may include, for example, web search, images search, news search, shopping search, and local search. When a search is activated by pressing the Enter key on a keyboard or clicking on the "Go" button, a search of the type selected in the search type menu 408 is performed using whatever string is typed into the mini toolbar search box 402. For example, if "Web Search" is selected, a Web search is performed. On the other hand, if "Image Search" is selected, a search of images is performed. In some embodiments, Web search is the default search type. The search type menu 408 may be accessed by selecting a search type menu chevron 403.

The mini toolbar search box 402 helps save screen space for the document display region 204 while still providing access to at least some of the features and tools of the toolbar 302. Instead of forcing the user into a choice between having the toolbar and less screen space for documents or having the screen space and losing the toolbar features, the miniaturizable toolbar annexes itself to another part of the chrome region, allowing the toolbar to be hidden while its features remain accessible to the user, giving more screen space to the document display region 204 without giving up all of the toolbar's functionality. The options to hide one or both provide the user with flexibility to balance his need for document screen space and toolbar features (or ease of access to toolbar features) according to his or her preferences.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
    displaying, by a device, a toolbar in a first sub-region of a chrome region of a user interface,
        the toolbar including a plurality of selectable options;
    receiving, by the device, selection of a first selectable option, of the plurality of selectable options, in the toolbar;
    ceasing, by the device and based on the selection, display of the toolbar and any information associated with the toolbar in the first sub-region of the chrome region; and
    annexing, by the device and based on the selection, an object corresponding to the toolbar to a second sub-region of the chrome region not previously occupied by the toolbar,
        the object including information accessible from the toolbar,
            the information including at least one of:
                features accessible from the toolbar,
                tools accessible from the toolbar, or
                operations accessible from the toolbar.

2. The method of claim 1, where the second sub-region of the chrome region includes a reserved portion of the chrome region.

3. The method of claim 1, further comprising:
    hiding, based on the selection, the toolbar from display; and
    displaying the object,
        the object occupying less space in the chrome region than the toolbar occupied in the first sub-region.

4. The method of claim 1, where the second sub-region of the chrome region includes a search box, and, when annexing the object to the second sub-region of the chrome region, the method includes:
    annexing the object to the search box.

5. The method of claim 1, where the toolbar includes a toolbar search box and the toolbar search box and the object share a combined search history log.

6. The method of claim 1, where one of more of the plurality of selectable options correspond to one or more operations accessible from the toolbar and not accessible from the object.

7. The method of claim 1, where, when annexing the object to the second sub-region of the chrome region, the method includes:
    replacing at least one selectable option of the chrome region with the object.

8. A non-transitory computer readable storage medium storing instructions, the instructions comprising:
    one or more instructions which, when executed by at least one processor, cause the at least one processor to:
        display a toolbar in a first sub-region of a chrome region of a user interface,
            the toolbar including a plurality of selectable options;
        receive selection of a first selectable option, of the plurality of selectable options, in the toolbar;
        cease, based on the selection, display of the toolbar and any information associated with the toolbar in the first sub-region of the chrome region; and
        annex, based on the selection, an object corresponding to the toolbar to a second sub-region of the chrome region not previously occupied by the toolbar,
            the object including information accessible from the toolbar,
                the information including at least one of:
                    features accessible from the toolbar,
                    tools accessible from the toolbar, or
                    operations accessible from the toolbar.

9. The computer readable storage medium of claim 8, where the second sub-region of the chrome region includes a reserved portion of the chrome region.

10. The computer readable storage medium of claim 8, further comprising:
    one or more instructions to hide the toolbar from display; and
    one or more instructions to display the object,
        the object occupying less space in the chrome region than the toolbar occupied in the first sub-region.

11. The computer readable storage medium of claim 8, where the second sub-region of the chrome region includes a search box, and the one or more instructions to annex the object to the second sub-region of the chrome region include:
    one or more instructions to annex the object to the search box.

12. The computer readable storage medium of claim 8, where the toolbar includes a toolbar search box and the toolbar search box and the object share a combined search history log.

13. The computer readable storage medium of claim 8, where one of more of the plurality of selectable options correspond to one or more operations accessible from the toolbar and not accessible from the object.

14. The computer readable storage medium of claim 8, where the one or more instructions to annex the object to the second sub-region of the chrome region comprises include:
    one or more instructions to replace at least one selectable option of the chrome region with the object.

15. A device comprising:
    a memory storing instructions; and
    one or more processors to execute the instructions to:
        display a toolbar in a first sub-region of a chrome region of a user interface,
            the toolbar including a plurality of selectable options;
        receive selection of a first selectable option, of the plurality of selectable options, in the toolbar:
        cease, based on the selection, display of the toolbar and any information associated with the toolbar in the first sub-region of the chrome region; and
        annex, based on the selection, an object corresponding to the toolbar to a second sub-region of the chrome region not previously occupied by the toolbar,
            the object including information accessible from the toolbar,
                the information including at least one of:
                    features accessible from the toolbar,
                    tools accessible from the toolbar, or
                    operations accessible from the toolbar.

16. The device of claim 15, where the second sub-region of the chrome region includes a reserved portion of the chrome region.

17. The device of claim 15, where the one or more processors are further to:
   hide, based on the selection, the toolbar from display; and
   display the object,
      the object occupying less space in the chrome region than the toolbar occupied in the first sub-region.

18. The device of claim 15, where the second sub-region of the chrome region includes a search box, and the one or more processors, when annexing the object to the second sub-region of the chrome region, are further to:
   annex the object to the search box.

19. The device of claim 15, where the toolbar includes a toolbar search box and the toolbar search box and the object share a combined search history log.

20. The device of claim 15, where one of more of the plurality of selectable options correspond to one or more operations accessible from the toolbar and not accessible from the object.

21. The device of claim 15, where the one or more processors, when annexing the object to the second sub-region of the chrome region, are further to:
   replace at least one selectable option of the chrome region with the object.

22. A user interface comprising:
   a content display region; and
   a chrome region that includes a toolbar,
      the toolbar including a plurality of selectable options in a first sub-region of the chrome region,
      the toolbar, and any information associated with the toolbar, being removed from the first sub-region of the chrome region based on selection of a first selectable option of the plurality of selectable options, and
   an object corresponding to the toolbar being annexed, based on the selection, to a second sub-region of the chrome region not previously occupied by the toolbar,
      the object including information accessible from the toolbar,
         the information including at least one of:
            features accessible from the toolbar,
            tools accessible from the toolbar, or
            operations accessible from the toolbar.

* * * * *

UNITED STATES PATENT AND TRADEMARK OFFICE
CERTIFICATE OF CORRECTION

PATENT NO. : 8,522,162 B2  
APPLICATION NO. : 13/274259  
DATED : August 27, 2013  
INVENTOR(S) : Gueorgui N. Djabarov et al.

Page 1 of 1

It is certified that error appears in the above-identified patent and that said Letters Patent is hereby corrected as shown below:

In the Claims  
Please correct Claim 14 (Column 8, Line 42) to read as follows:  
second sub-region of the chrome region include:

Signed and Sealed this  
Nineteenth Day of November, 2013

Teresa Stanek Rea  
*Deputy Director of the United States Patent and Trademark Office*